(12) United States Patent
Masters et al.

(10) Patent No.: US 9,284,518 B2
(45) Date of Patent: Mar. 15, 2016

(54) MULTI-ARM HYDROPHILIC URETHANE POLYMERS, METHODS OF MAKING THEM, AND COMPOSITIONS AND PROCESSES EMPLOYING THEM

(71) Applicant: Stepan Company, Northfield, IL (US)

(72) Inventors: Ronald Anthony Masters, Glenview, IL (US); Douglas Kip Hillshafer, Western Springs, IL (US); Christopher A. Gariepy, Northbrook, IL (US)

(73) Assignee: STEPAN COMPANY, Northfield, IL (US)

( * ) Notice: Subject to any disclaimer, the term of this patent is extended or adjusted under 35 U.S.C. 154(b) by 78 days.

(21) Appl. No.: 14/045,843

(22) Filed: Oct. 4, 2013

(65) Prior Publication Data

US 2014/0038874 A1 Feb. 6, 2014

Related U.S. Application Data

(63) Continuation of application No. PCT/US2012/032339, filed on Apr. 5, 2012.

(60) Provisional application No. 61/472,503, filed on Apr. 6, 2011.

(51) Int. Cl.

| | | |
|---|---|---|
| C08L 53/00 | (2006.01) |
| C08L 75/00 | (2006.01) |
| C08L 75/04 | (2006.01) |
| C11D 7/32 | (2006.01) |
| C08G 81/00 | (2006.01) |
| C08G 18/48 | (2006.01) |
| C08G 18/75 | (2006.01) |
| C08G 18/32 | (2006.01) |
| C11D 3/37 | (2006.01) |

(52) U.S. Cl.
CPC .......... *C11D 7/3263* (2013.01); *C08G 18/3206* (2013.01); *C08G 18/4833* (2013.01); *C08G 18/758* (2013.01); *C08G 81/00* (2013.01); *C11D 3/3726* (2013.01)

(58) Field of Classification Search
CPC ....... C11D 3/3726; C08L 53/00; C08L 75/00; C08L 75/04
See application file for complete search history.

(56) References Cited

U.S. PATENT DOCUMENTS

| | | | |
|---|---|---|---|
| 5,468,804 | A | 11/1995 | Schmalstieg et al. |
| 5,648,506 | A | 7/1997 | Desai et al. |
| 6,252,014 | B1 | 6/2001 | Knauss |
| 2003/0143596 | A1 | 7/2003 | Bentley et al. |
| 2005/0031793 | A1 | 2/2005 | Moeller et al. |
| 2006/0047110 | A1 | 3/2006 | Schaefer |
| 2009/0068138 | A1 | 3/2009 | Huang et al. |
| 2009/0118436 | A1 | 5/2009 | Niitani |
| 2010/0124649 | A1* | 5/2010 | Rukavina et al. .......... 428/292.1 |
| 2010/0209613 | A1 | 8/2010 | Rong et al. |
| 2010/0267886 | A1 | 10/2010 | Roller et al. |
| 2010/0273949 | A1 | 10/2010 | Jakubowski et al. |
| 2010/0280165 | A1 | 11/2010 | Terrenoire |
| 2011/0112267 | A1 | 5/2011 | Jakubowski et al. |

OTHER PUBLICATIONS

International Search Report and Written Opinion in PCT/US2012/032339, dated Jul. 9, 2012.

Knauss, D. M. et al. "Synthesis and Characterization of Poly(ethylene Oxide) Stars with Crosslinked Polyurethane Core" Polymer Preprints (1997), vol. 38, No. 2, pp. 191-192.

* cited by examiner

*Primary Examiner* — Brian P Mruk
(74) *Attorney, Agent, or Firm* — McAndrews, Held & Malloy, Ltd.

(57) ABSTRACT

Hydrophilic, multi-arm urethane polymers are described that are dispersible and/or soluble in water, and provide wetting, foaming and cleaning benefits for aqueous cleaning products, including hard surface cleaners, machine dishwash, and liquid hand dishwash compositions.

20 Claims, 1 Drawing Sheet

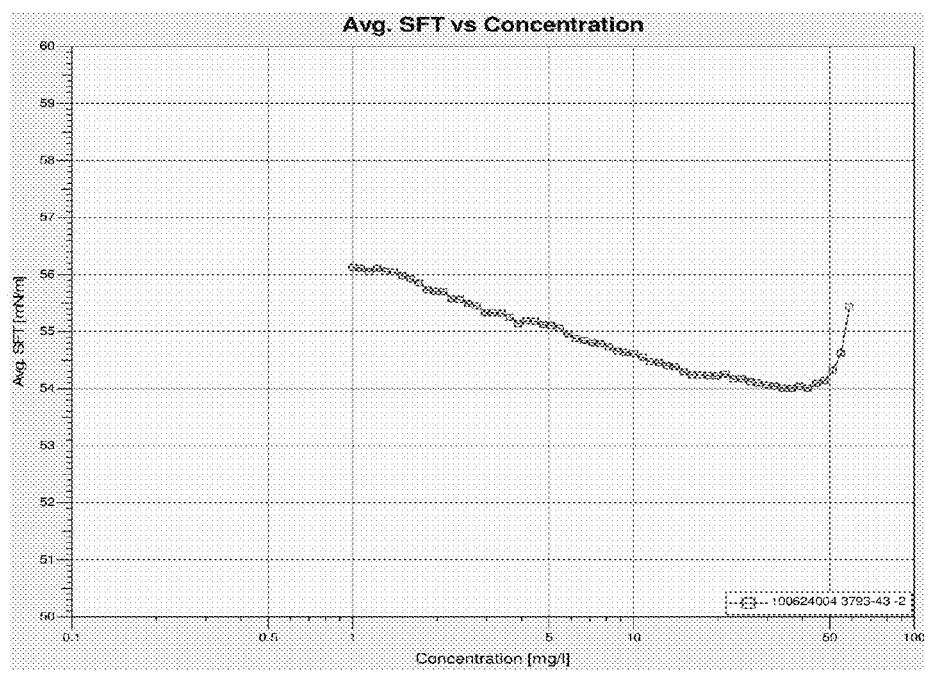

MULTI-ARM HYDROPHILIC URETHANE POLYMERS, METHODS OF MAKING THEM, AND COMPOSITIONS AND PROCESSES EMPLOYING THEM

RELATED APPLICATIONS

This application is being filed as a continuation application of the International PCT Application No. PCT/US2012/032339, entitled "MULTI-ARM HYDROPHILIC URETHANE POLYMERS, METHODS OF MAKING THEM, AND COMPOSITIONS AND PROCESSES EMPLOYING THEM" filed on Apr. 5, 2012 which claims priority to U.S. Provisional Application No. 61/472,503 filed on Apr. 6, 2011, with the title "Multi-Arm Hydrophilic Urethane Polymers, Methods of Making Them, And Compositions and Processes Employing Them," the contents of which are incorporated by reference in their entirety.

BACKGROUND OF THE INVENTION

The present technology, in general, relates to water-dispersible or water-soluble multi-arm polymers which contain at least one urethane bond and compositions thereof; methods of manufacture; and the various applications or processes that use them.

In particular, these polymers are designed to be water-dispersible and/or soluble. The literature is replete with examples of urethane polymers that are designed to provide structural properties for furniture foam, contact lenses, wound dressings, adhesives, curable coatings and the like. The polymers of this invention are different in that they are designed to be incorporated into aqueous cleaning compositions to provide surface wetting and/or sustained foaming benefits. This requires properties very different than the prior art urethane polymers, which are generally only water swellable, if not water insoluble.

BRIEF SUMMARY OF THE INVENTION

In one aspect, the present technology provides a star polymer, wherein the star polymer comprises:
a core comprising a C1-6 linear, branched, cyclic or other hydrocarbon organic molecules having at least one functional group,
one or more arms bonded to the core group wherein each arm has the following Formula 1:

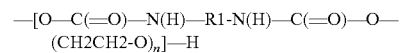

where n=4-12, and R1 is the same or different and can be dicyclohexylmethane, diphenylmethane, or toluene. In further embodiments, at least some of the arms of the star polymer are crosslinked via bonds formed between the diisocyanate groups at the free-end of each arm and at least one hydrophilizing molecule that possesses at least two hydrophilic groups per molecule. In some aspects, the star polymer has from 1 to 6 arms. In other aspects, the hydrophilizing molecule is polyethylene glycol that reacts across the diisocyanates attached to different core groups lightly crosslinking the star polymers to provide the water-soluble and/or water-dispersible polymers of the present technology.

The compositions of the present technology are best described by the combination of materials that make them and the process used. Numerous structures are present, all of which will contain the urethane bond, and also which contain the hydrophilizing polyol. Below are depicted two embodiments of the present technology, one example of the un-crosslinked star polymer (Formula 2) of the present technology, and one example of the cross-linked star polymer (Formula 3) of the present technology:

Formula 2, where the components are trimethylolpropane, Desmodur® W, and polyethylene glycol (PEG), e.g. PEG-400.

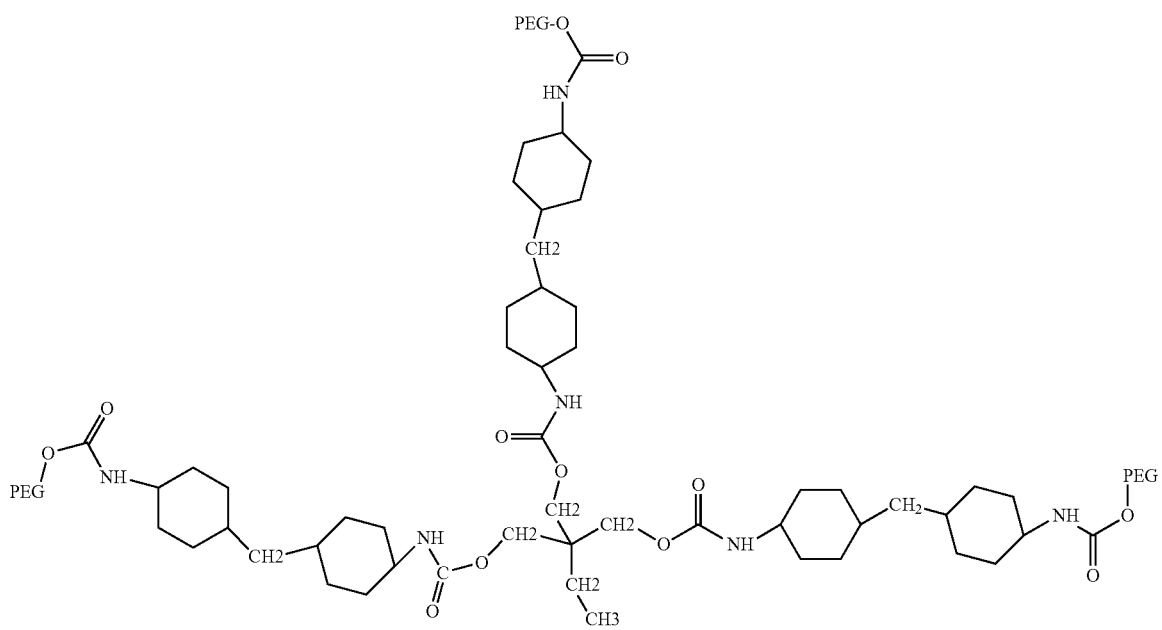

Formula 3, where the components are the same as formula 2, but a crosslink has occurred:

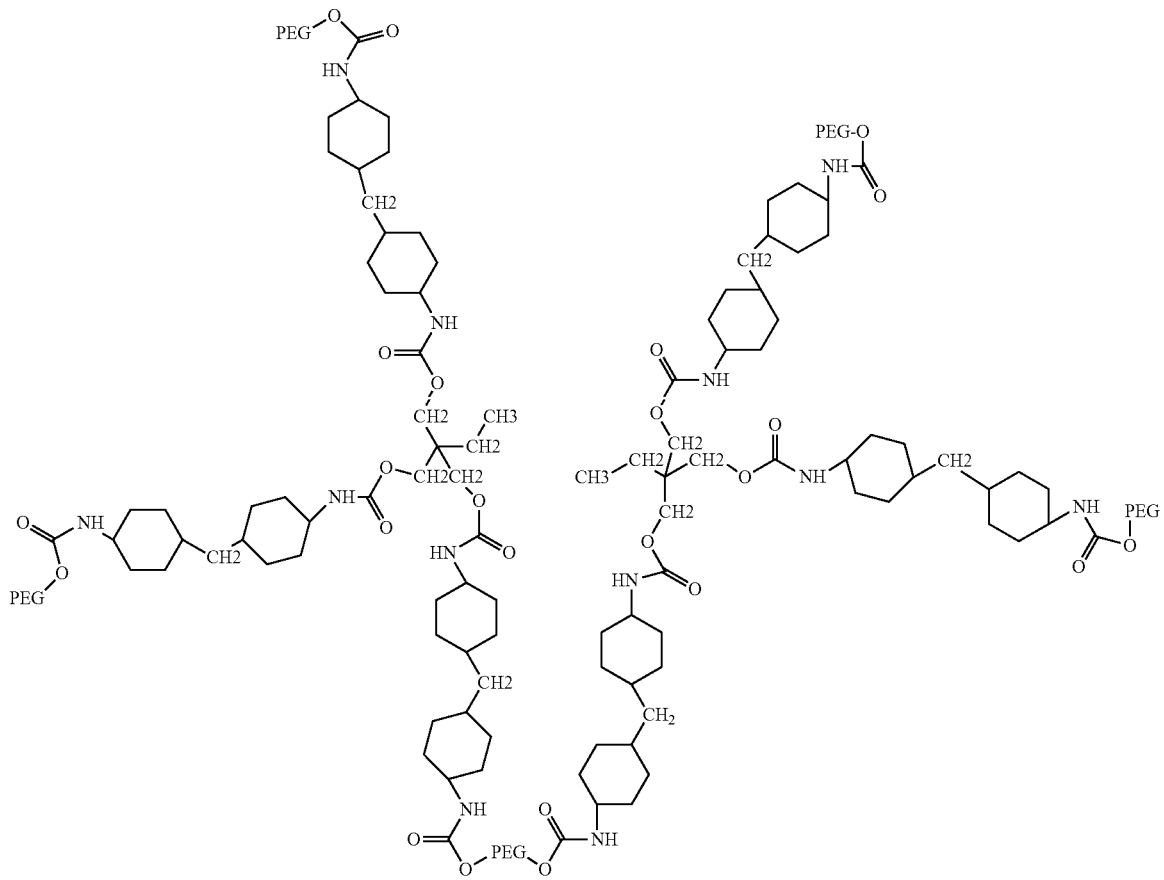

Another aspect of the present technology provides at least one composition manufactured via the reaction of at least one C1-6 polyol with at least one diisocyanate, followed by reaction with at least one low molecular weight polyethylene glycol.

In yet another aspect, the technology provides at least one composition with the above described polymers dispersed or dissolved in water to provide a detergent composition.

In other aspects of the present technology, there is provided at least one cleaning composition containing the above-described polymer combined with a surfactant.

A further aspect of the present technology provides at least one foaming liquid detergent composition including from about 0.01% to about 1.0% of the above-described polymer.

In another aspect, the present technology provides a hard surface cleaner composition comprising from about 0.01% to about 1.0% of the above-described polymer.

In another aspect, the present technology provides a glass cleaner composition comprising from about 0.01% to about 1.0% of the polymer of the present technology.

In another aspect, the present technology provides a cleaning composition comprising from about 0.01% to about 1.0% of the above-described polymer which leaves the surface more water-wettable after cleaning.

BRIEF DESCRIPTION OF THE DRAWINGS

FIG. 1 is a graph of surface tension vs. concentration for an aqueous solution containing the polymer of the present technology.

DETAILED DESCRIPTION OF THE INVENTION

The present technology generally relates to water-dispersible and/or water-soluble polymers manufactured from a polyhydroxy core molecule reacted with a diisocyanate, followed by reaction with a hydrophilic diol or polyol to create a multi-arm, hydrophilic, urethane based molecular polymer structure that can provide wetting of surfaces and/or structural longevity to aqueous foaming systems. The materials and method of manufacture create polymers with arms that emanate from a core, with the possibility of minimal levels of crosslinking. The materials and processes of the present technology are chosen to ensure the number average molecular weight of the polymer is 10,000 or less, and that the polymer is at least dispersible into water as well as being soluble. The materials and method of manufacture are chosen to ensure at least one nitrogen, preferable at least two or more nitrogen atoms are present in each arm of the polymer. In one embodiment of the present technology, the at least one nitrogen, preferably at least two nitrogen atoms form urethane links within each polymer arm. The materials and method of manufacture are chosen to ensure the presence of sufficient —CH2CH2-O— or other hydrophilic molecular groups to render the polymer hydrophilic and therefore water-dispersible and/or water-soluble. Additional components may be added that are consistent with the above requirements. An example includes diglycolamine, in which both the hydroxyl and amine are reactive toward each isocyanate group, providing additional nitrogen functionality in the polymer in the form of urethane and/or urea bonds.

For the present technology, water-dispersible and/or soluble herein refers to a composition that is an isotropic, homogeneous and/or single-phase solution containing the polymeric composition of the present technology and water, wherein the polymeric composition is dispersible in water to make a homogeneous dispersion. In some embodiments, the composition is able to combine with water to form greater than 50% dispersed solubilized gel or solution. When more water is added to the polymeric compositions of the present technology, the polymeric composition continues to disperse to provide a homogeneous solution, and the polymeric composition does not form clumps and provides a uniform solution or gel. Not to be bound by any particular theory, it is believed that the length of the chain in between the functional groups provides the water-dispersible property of the polymer composition.

In some embodiments of the present technology, it is desirable to enhance the ability of detergent products to sustain a head of foam as the product is used to clean, since foam retention is the signal that the product is still working, as in light duty liquid hand dishwash detergents. The present polymer technology provides for an increase in the longevity of foam in the presence of soil. In some embodiments, the compositions of the present technology provide enhanced foam performance. Enhanced foam performance for the present technology can be measured as greater than foam performance as compared to formulations that do not include a polymer composition of the present technology, for example at least 5% increased foam performance, more preferably at least 10% increased foam performance.

Foam performance can be measured by methods known in the art and include, but are not limited to, foam mileage test as described in the Examples below. Briefly, a first suitable test to measure foam mileage is the Automated Crisco®-only gram test which is a modified version of the Mini-Plate test as disclosed in Anstett, R. M., and E. J. Schuck, JAOCS, "Miniature Dishwashing Evaluation Method" volume 43, October 1966, pp. 576-580. Briefly, a 0.1% solution of the light duty liquid (LDL) is prepared in 500 grams in 150 ppm hardness water at a starting temperature of the test solution of approximately 120° F. (approximately 50° C.). This wash bath is agitated with a Kitchen-Aid Mixer set on a speed of 6 with a standard whisk, producing copious initial foam. Crisco® shortening, which serves as the soil in this procedure, is titrated into the wash solution at a rate of no more than 0.5 grams per minute with a syringe. The amount of Crisco® tolerated prior to foam collapse is the foam mileage for the formula.

A second suitable foam mileage test includes the MiniPlate Test as disclosed in Anstett, R. M., and E. J. Schuck, JAOCS, "Miniature Dishwashing Evaluation Method" volume 43, October 1966, pp. 576-580 but again using Crisco® vegetable shortening as the soil. Briefly, the Mini-plate test places 0.36 grams of Crisco® Shortening Soil on miniplates. One plate is washed every 45 seconds using the test composition at a 0.1% concentration in 150 ppm tap water, at a starting temperature of 50° C., until the LDL no longer foams. The number of plates cleaned before the LDL no longer foams is indicative of the foam mileage of the LDL. For embodiments of the present technology, "enhanced" is defined as an amount of foam mileage that at least 5% greater than the foam mileage of compositions not containing the polymer composition of the present technology, more preferably at least 10% or greater, on a relative gram or miniplate basis.

Some embodiments of the present technology provide for a two-step manufacturing process in which a pre-polymer is formed by reacting trimethylolpropane with dicyclohexylmethane-4,4'-diisocyanate to form a mixture of 1-arm to 3-arm star pre-polymers. These prepolymers are then hydrophilized via the second step reaction of the terminal isocyanates with polyethylene glycol to form a larger, hydrophilic 3-arm polymer. Some of the polyethylene glycol crosslinks isocyanates across two prepolymers, creating additional structure. In this two-step manufacturing process, the prepolymer is hydrophobic while the end polymeric composition is hydrophilic and dispersible and/or soluble in water. The ratio of ingredients, order of addition and stepwise process is important to provide the limited (minimal degree of) crosslinking and water dispersing/solubility properties of the final polymeric composition.

In additional embodiments, the present technology provides compositions comprising star polymers or crosslinked star polymers. "Star polymer" is used throughout this specification to describe water soluble and/or water-dispersible polymers that generally have a core and one or more arms radiating out from the core via urethane bonds. The core comprises a C1-6 linear, branched or cyclic hydrocarbon having one or more functional —OH groups, and each arm comprises a diisocyanate. The star polymers preferably have a number average molecular weight of 10,000 or less. The star polymers of the present technology are made by a two step procedure, in which the first step comprises the forming of a prepolymer by reacting the core with at least one or more arms, the one or more arms comprising a diisocyanate, to form a multi-arm star polymer structure (pre-polymer). In preferred embodiments, the at least one or more arms is about 1 to about 6 arms. This pre-polymer structure is then hydrophilized in the second step of the procedure by reacting the terminal-end of the isocyanate arms with hydrophilizing molecules to form a larger, multi-arm polymer.

In one embodiment of the present technology, the star polymer comprises:
a core comprising a C1-6 linear, branched, cyclic or other hydrocarbon organic molecule having at least one functional group,
one or more arms bonded to the core wherein the each arm comprises Formula 1:

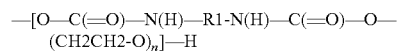

where n=4-12, and R1 is the same or different and can be dicyclohexylmethane, diphenylmethane, or toluene. The star polymer can comprise 1 to 6 arms. In further embodiments, the star polymer is lightly crosslinked via bonds formed between the diisocyanate groups at the free-end of each arm and at least one hydrophilizing molecule that possesses at least two hydrophilic groups per molecule.

In some embodiments, the number of arms is preferably about 2 to 3, and n is about 4-10, preferably about 9.

The core of the polymer may consist of any organic molecule with at least one functional —OH. Suitable organic molecules with one or more functional —OH groups include, but are not limited to, for example, materials such as trimethylolpropane (TMP), glycerine, glucose, dextrose, propylene glycol, 1,3-propanediol, and the like. In some preferred embodiments, the core polymer comprises trimethylolpropane.

The urethane bond to the polyol core can be formed from any diisocyanate to make a prepolymer. Preferred diisocyanates include, but are not limited to, for example, dicyclohexylmethane-4,4'-diisocyanate (e.g. Desmodur® W, available from Bayer MaterialScience, Pittsburgh, Pa.), 4,4'-diphenylmethane diisocyanate (Mondur® M, available from Bayer MaterialScience AG, Pittsburgh, Pa.), and 2,4-toluene diisocyanate (Mondur® TDS, available from Bayer MaterialScience, Pittsburgh, Pa.). In the most preferred embodiment, the diisocyanate is aliphatic Desmodur® W.

In the second step, the prepolymer is reacted with hydrophilizing molecules that possesses at least two hydrophilic groups per molecule, including hydroxyl and/or amine. Examples of hydrophilic containing molecules include, but are not limited to, glucose, polyethylene glycol (PEG), polyglycerol, and diglycolamine. In the preferred embodiment, the molecule with at least two hydrophilic groups is polyethylene glycol. Although not wanting to be bound by a particular theory, it is believed that the polymer of the present technology is able to hydrogen bond via these hydrophilic groups across surfactant molecule headgroups, both in solution at the interface between emulsified soil and water, and in the bubble at the bi-layer interface, stabilizing these structures in solution and at the air-liquid interface. Each arm of the polymer contains hydrophilic groups and at least one nitrogen atom, facilitating this mechanism. Thus, the polymers of the present technology surprisingly provide an increase in foam mileage over a composition not containing this polymer. The Examples below provide evidence that a comparable polymer lacking a nitrogen atom, glycereth-26, does not provide the superior foam mileage enhancement provided by the polymers of the present technology.

In some embodiments of the present technology, the core is TMP, CH3CH2C(CH2OH)$_3$, the number of arms can be 1 to 3 and $R_1$ in Formula 1 is dicyclohexylmethane, diphenylmethane, or toluene and n is from 4 to 12.

In other embodiments of the present technology, the core is propylene glycol (CH3-CHOH—CH2-OH), the number of arms can be 1 to 3, and R1 in Formula 1 can be dicyclohexylmethane, diphenylmethane, or toluene and n is 4 to 12.

In other embodiments of the present technology, the core is glycerine (CH2OHCHOHCH2OH), the number of arms can be 1 to 3, and R1 in Formula 1 can be dicyclohexylmethane, diphenylmethane, or toluene and n is 4 to 12.

In other embodiments of the present technology, the core is 1,3-propanediol (CH2OHCH2CH2OH), the number of arms can be 1 to 2, and R1 in Formula 1 can be dicyclohexylmethane, diphenylmethane, or toluene and n is 4 to 12.

The compositions of the present technology are best described by the combination of materials that make them and the process used. Numerous structures are present, all of which will contain the urethane bond, and also which contain the hydrophilizing polyol. Below are depicted two embodiments of the present technology, one example of the un-crosslinked star polymer (Formula 2) of the present technology, and one example of the cross-linked star polymer (Formula 3) of the present technology: Structures of Formula 3 represent crosslinked versions of Formula 2 in which the polyethylene glycol reacts across diisocyanates attached to different core groups.

Formula 2, where the components are trimethylolpropane, Desmodur® W, and polyethylene glycol (PEG), e.g. PEG-400.

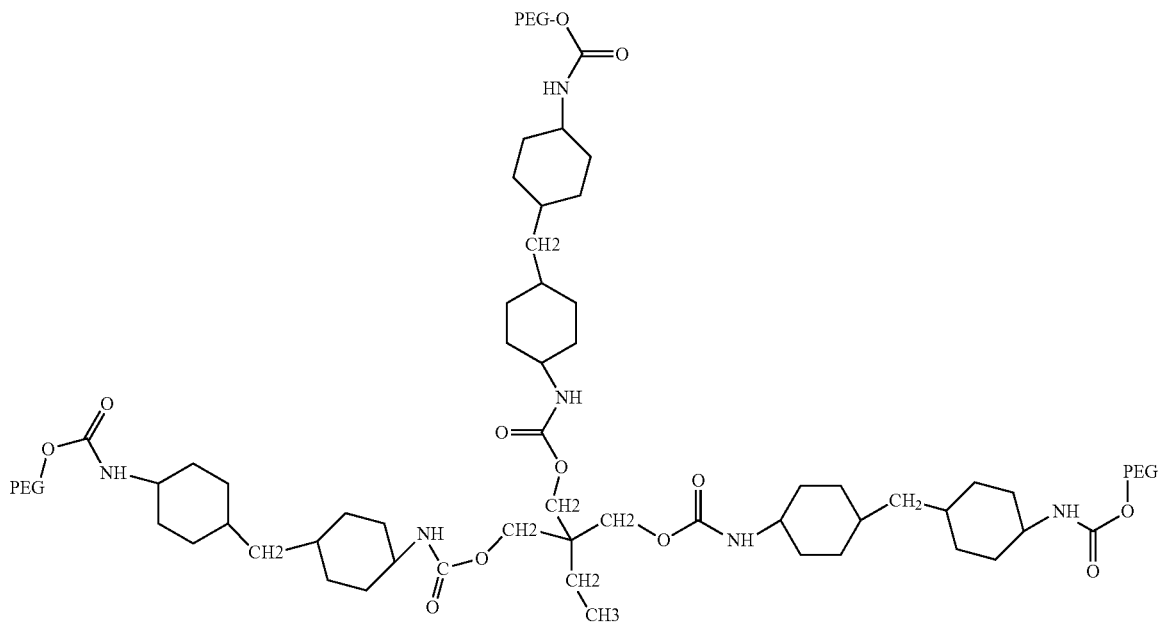

The Formula 2 polymer has an average molecular weight of 2231.47.
Formula 3, where the components are the same as Formula 2, but a crosslink has occurred:

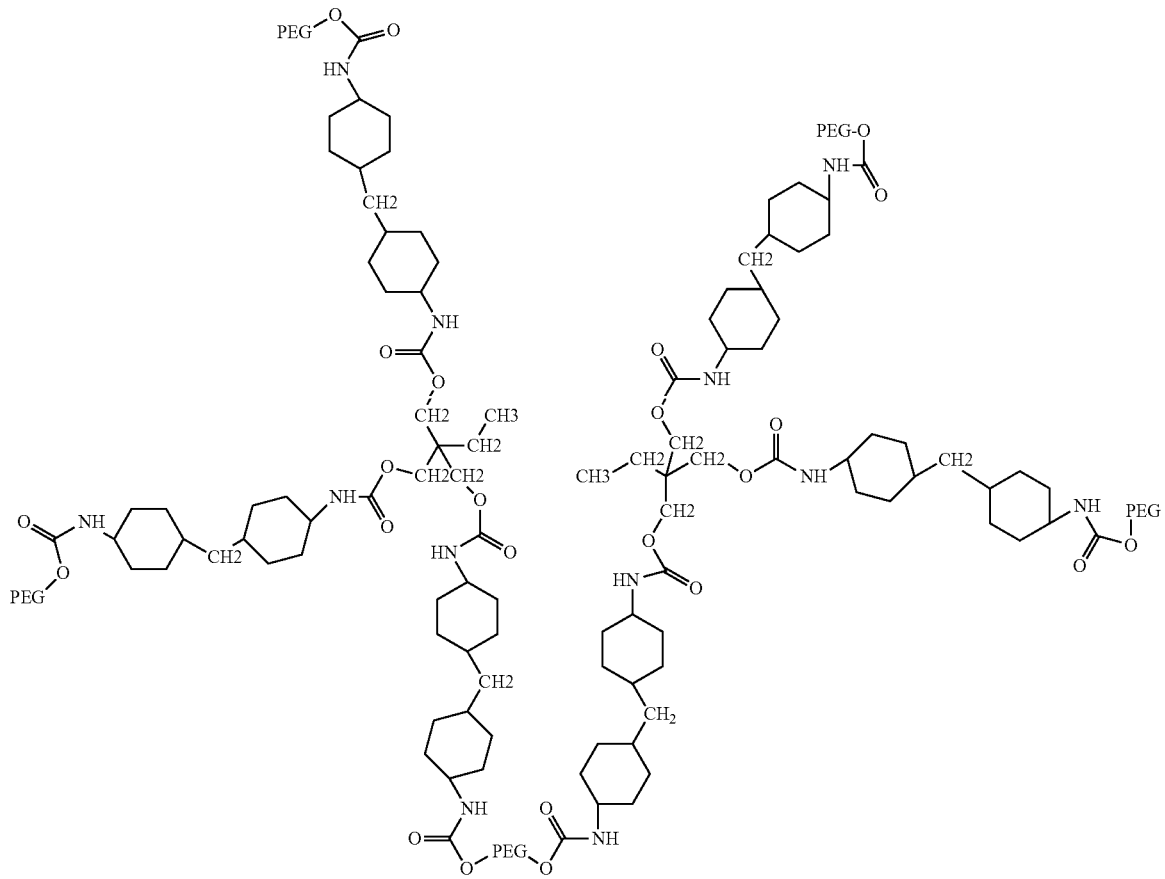

wherein PEG is polyethylene glycol. The Formula 3 polymer has an average molecular weight of 4062.95.

Another embodiment of the present technology provides at least one composition manufactured by the two step process via the reaction of at least one C1-6 polyol with at least one diisocyanate, followed by reaction with at least one low molecular weight polyethylene glycol. A low molecular weight polyethylene glycol (PEG, $H[OCH_2CH_2]_nOH$) includes polyethylene glycols where n is from about 4 to about 20, and includes, but is not limited to polyethylene glycols with molecular weights of about 200 g/mol to about 3000 g/mol, and preferably about 200 g/mol to about 1000 g/mol, including any molecular weights in between, for example, but not limited to, PEG 200, PEG 300, PEG 400, PEG 600, PEG 800, PEG 1000, etc.

The two step reaction is performed with materials selected and at ratios selected to provide the necessary minimal degree of cross-linking to provide a water-dispersible and/or water soluble polymer that provides enhanced foaming. In the first step, the core (for example TMP) is added to an excess of the diisocyanate, for example a 1:3 ratio (which would provide a prepolymer structure with an average of about 3 arms from each core) to about a 1:6 ratio (would provide a pre-polymer with an average of 6 arms from each core). The first reaction is carried out at a temperature of about 60° C. to about 120° C., preferably about 60° C. to about 100° C. This pre-polymer formed in the process of the present technology is hydrophobic and not water-dispersible. This pre-polymer is then reacted with an excess of the hydrophilic containing molecules (e.g. PEG), for example a ratio of 1 equivalent prepolymer to about 3 equivalents PEG. In some embodiments the ratio of prepolymer to PEG in equivalents can be from about 1:2 to about 1:6, preferably about 1:3. The present technology provides a minimal degree of crosslinking that allows for properties of the polymer of the present technology to be water-dispersible and/or water-soluble. For example, the minimal degree of cross-linking can be defined as from zero to an amount of cross-linking in which the polymer is able to disperse or dissolve in water to form a single continuous phase. Too much crosslinking would lead to non-dispersible polymers, and more solid compositions that are not desired with the present technology. Not to be bound by any particular theory, but it is believed that the di-functional PEG (2-OH groups per PEG) can crosslink the arms of different pre-polymer molecules to form the crosslinking that provides the necessary properties of the present technology to form the water-dispersible or water-soluble polymer composition of the present technology. The second reaction is performed at a temperature about 60° C. to about 120° C., preferably about 60° C. to about 100° C.

Generally, in the art, urethane polymers are used to create materials ranging from rigid to flexible furniture foams, coatings and adhesives, and other water-insoluble forms. Additionally, urethane polymers are used to create hydrogel materials that swell with water to form flexible contact lenses, wound dressings, and similar medical devices. It is believed that this present technology represents the first ever application of urethane polymer chemistry to form water-dispersible and/or soluble materials. It is also believed that this present technology represents the first ever use of such materials in cleaning products to enhance wetting, cleaning, and/or foam bubble characteristics of aqueous compositions.

Such compositions of the present technology can be used in end-use applications including, but not limited to, household, industrial and institutional cleaning products, for example light duty detergent liquids, pre-soak liquids, bath and kitchen hard surface and/or article cleaners, glass cleaners, and the like. Suitable exemplary light duty detergent liquids include those formulations that can be found in U.S. Pat. No. 5,637,758, incorporated by reference in its entirety. One skilled in the cleansing and/or detergent art will appreciate the variety of formulations of the present technology as well as the application thereof. The polymer compositions of the present technology may be used in a ready-to-use or dilutable kitchen or bathroom cleaner form. Such kitchen and bathroom cleaners include the compositions described herein which are diluted about 1:4 to about 1:1000 with water into a ready-to-use end composition, for example the compositions can be diluted about 1:4, 1:10, 1:28, 1:64, 1:128, and the like. In some embodiments, the polymer compositions of the present technology can be use in automatic machine dishwashing compositions, or in pre-soak dishwashing detergents.

In some embodiments of the present technology, it is desirable to enable a cleaning product to wet surfaces using low amounts of detergent ingredients. In embodiments of the present technology, low amounts of detergent ingredients include, amounts less than 1%, alternatively amounts less than 0.3%.

The present polymer technology provides wetting of surfaces at levels less than about 0.01%, even in the absence of any surfactants. In some embodiments, the present polymer technology provides wetting of surfaces at levels between about 0.01% and about 0.1%. Wetting of surfaces can be measured by any means known to one skilled in the art, and include, for example, the contact angle test and surface tension test.

The polymer compositions of the present technology may be used at about 0.01% to about 50% by weight of the total composition in a cleaning composition, depending on the end use applications. In preferred embodiments, the polymer compositions are used at 0.01% to about 10% by weight of the total composition, in other preferred embodiments, the polymer compositions are used in about 0.1% to about 10% by weight of the total composition.

The polymers of the present technology may be used at levels as low as 0.01% in aqueous solution, preferably from about 0.01% to about 1%, alone or in combination with any surfactant, to provide a glass cleaning composition. In a preferred embodiment, the polymer of the present technology can be used in an amount of about 0.01% to about 1%, preferably 0.01% to about 0.1%, in a glass cleaner containing no other surfactants or other solvents. This glass cleaner provides cleaning and wetting of the surface, and the surface film dries evenly without the use of a solvent.

The polymers of the present technology may be used at levels from about 0.01% to about 1.0% in all-purpose or bath cleaner solutions to enhance surface wetting and reduce redeposition of soil.

The polymers of the present technology may be used at levels from about 0.01% to about 1.0% in foaming cleaning compositions to enhance foam volume and longevity for cling to vertical surfaces.

The polymers of the present technology may be used at levels from about 0.01% to about 1.0% in light duty liquid hand dishwash detergents to increase foam longevity, especially in the presence of soil. In some embodiments, the polymer is used at levels from about 0.05% to about 0.5%, alternatively from about 0.05% to about 2%.

The polymers of the present technology may be used at levels from about 0.01% up to about 1.0% in detergent compositions to enhance soil release. Soil release can be measured by means known to one skilled in the art, including, ASTMD 4488-95 cleaning method. This method is a 2 cycle soil and cleaning method, wherein a product with the polymer of the present technology can be compared with the product without the polymer of the present technology.

The polymers of the present technology may be used at levels from about 0.01% up to about 1.0% in machine or hand dishwash compositions to enhance sheeting of water from surfaces to enable spot-free drying.

The polymers of the present technology may be used at levels from about 0.01% up to about 1.0% in light duty liquid dishwash compositions that contain sparingly water solvents for cleaning, the polymer serving to restore foam and foam longevity that would otherwise be lost by incorporation of the cleaning solvent. Such light duty liquid dishwashing compositions containing solvents are disclosed in International PCT Application No. PCT/US2010/061020, filed on Dec. 17, 2010, which is incorporated herein in its entirety. Furthermore, the polymers of the present technology allow for recovered foam and foam longevity in the presence of cleaning solvents without requiring a rebalance of primary to secondary surfactant ratios as described in International PCT Application No. PCT/US2010/061020.

The polymers of the present technology may be used in foaming light duty liquid dish compositions that contain sparingly water soluble solvents for cleaning. In practice the polymers of the present invention may be combined with any amphiphilic material to provide a detergent or cleaning product with enhanced properties. Amphiphilic materials are known in the art and include, but are not limited to, surfactants, which may be anionic, nonionic, ampholytic (which includes amphoteric), zwitterionic, cationic, or mixtures thereof. Any surfactants known to one skilled in the art are envisioned to be used in the practice of the present technology.

One skilled in the art will recognize that modifications may be made in the present technology without deviating from the spirit or scope of the invention. The invention is further illustrated by the following examples, which are not to be construed as limiting the invention in spirit or scope to the specific procedures or compositions described therein.

EXAMPLES

Example 1

Exemplary Multi-Arm Hydrophilic Urethane Polymer

An example of a polymer of the present invention was made by first adding trimethylolpropane (TMP) slowly to the diisocyanate Desmodur® W (available from Bayer MaterialScience, Pittsburgh Pa.) under dry nitrogen sweep at 100° C. without catalyst over a period of about 3-5 hours with stirring. The composition was analyzed using ASTM D-2572-97 method, entitled "Standard Test Method for Isocyanate Groups in Urethane Materials or Prepolymers" to insure that the isocyantate reacted with the core TMP. After analysis showed residual NCO to be half initial value, the reaction flask was allowed to cool, upon which the product began to thicken, indicating reaction had taken place. Subsequently, in a second stage, polyethylene glycol (PEG-400) was added dropwise over a period of about 2 hours under nitrogen sweep at 70° C. with stirring. PEG-400 was added in a ratio of 3 moles PEG to 1 mole of the pre-polymer. It is envisioned that the reverse process could be performed in which pre-polymer of trimethylopropane and Desmodur® W could be added slowly dropwise to the polyethylene glycol to form the final polymer. Analysis showed the presence of some unreacted NCO. The reaction mix was stirred and heated at 70° C. under nitrogen sweep for an additional 2-4 hours, after which FTIR showed the presence of very little residual NCO, indicating completion of the reaction. The product was transferred to a metal can and allowed to cool. It set up to a sticky resin with a melt point of about 60° C. A portion was mixed with equal amounts of distilled water, and over a period of several hours, a clear 50% viscous solution of the polymer in water was formed. The handling properties of the 50% aqueous solution are superior to those of the neat polymer, being more flowable and less tacky. The presence of the water fully quenches any residual NCO that might be present in the polymer. Analysis of the polymer by GPC indicates MW at 8,000 and below. Analysis by MALDI-MS indicates the presence of urethane bonds to PEG, bonded to a TMP core, with a distribution corresponding to one and multi-armed molecules. Dissolution of 0.01% of the polymer in distilled water produces a clear solution with foam, as if a surfactant were present. The solution wets plastic and glass. A 1-ppm solution of the polymer in de-ionized water lowers surface tension from 72 mN/m down to 56 mN/m, without any surfactant being present in the test solution.

Example 2

Exemplary Liquid Hand Dishwash Formulations that Use the Polymer of this Technology The following list summarizes materials used in compositions that contain the polymer of the present technology:

| Trade Name | Chemical Name |
| --- | --- |
| Ammonyx ® LMDO | Lauramidopropyl/Myristamidopropyl Amine Oxide |
| Steposol ® M8-10 | [N,N-dimethyloctanamide (N,N-dimethylcaprylamide) and N,N-dimethyl-decanamide (N,N-dimethylcapramide)] |
| SLS | Sodium Lauryl Sulfate, available as Stepanol ® WA-Extra |
| Alpha-Step ® PC-48 | Sodium Methyl-2 Sulfo C12-C18 Ester and Disodium 2-Sulfo C12-C18 Fatty Acid |
| Urethane polymer | Exemplary polymer of this invention |

All of the trade-named components are commercially available from Stepan Company, of Northfield, IL.

The following list summarizes comparative polymeric materials outside the claims of this invention for comparison in the exemplary formulations:

| Trade Name | Chemical Family/Name |
| --- | --- |
| Aculyn 22 | Hydrophobically modified acrylate/alkyl acrylate (HASE) |
| Aculyn 44 | Hydrophobically modified ethoxylated urethane (HEUR) (linear polymer made from decyl alcohol, diisocyanate, PEG) |
| Glycereth-26 | Multi-arm polymer made by ethoxylating glycerine |

Aculyn is a trademarked product from the Dow Chemical Corporation, Midland MI.
Glycereth-26 is available from Sigma-Aldrich, St. Louis, Mo.

Table 1 summarizes light duty liquid hand dishwash compositions which contain typical surfactants used in these compositions, as well as various polymers both within (Formula B) and outside (Formula C, D, E) the claims of this invention (% Active as percent of total in composition) as compared with a control (Formula A):

TABLE 1

| Component | Formula A | Formula B | Formula C | Formula D | Formula E |
| --- | --- | --- | --- | --- | --- |
| SLS | 15.93 | 15.93 | 15.93 | 15.93 | 15.93 |
| Alpha-Step PC-48 | 7.97 | 7.97 | 7.97 | 7.97 | 7.97 |
| Ammonyx LMDO | 3.51 | 3.51 | 3.51 | 3.51 | 3.51 |
| Ethanol | 2.25 | 2.25 | 2.25 | 2.25 | 2.25 |
| MgSO4 | 1.08 | 1.08 | 1.08 | 1.08 | 1.08 |
| Water | balance | balance | balance | balance | balance |
| Urethane Polymer | — | 0.1 | | | |
| Aculyn 22 | — | | 0.1 | | |
| Aculyn 44 | — | | | 0.1 | |
| Glycereth-26 | — | | | | 0.1 |

Formula A is the control without polymer, Formula B is the same as control but containing the polymer of the present technology, and formulas C-E are the same as control but containing polymers outside the technology of this invention. Formula A is derived from examples and guidance provided in U.S. Pat. No. 5,637,758 (Sajic et al.).

These formulations were tested for their foaming ability as measured by foam mileage and their cleaning ability. The procedure is the Automated Mixed Soil gram test, which is a modified version of the Mini-Plate test as disclosed in Anstett, R. M., and E. J. Schuck, JAOCS, "Miniature Dishwashing Evaluation Method" volume 43, October 1966, pp. 576-580. A 0.1% solution of the LDL is prepared in 500 grams in 150 ppm hardness water at a starting temperature of the test solution of approximately 120° F. (approximately 50° C.). This wash bath is agitated with a Kitchen-Aid Mixer set on a speed of 6 with a standard whisk, producing copious initial foam. Soil, in the form of a mixture of Crisco® with whole egg powder as described in ASTM D4009-92, Soil D, is titrated into the wash solution at a rate of no more than 0.5 grams per minute with a syringe. As the soil is introduced, the foam eventually collapses. The amount of soil tolerated prior to foam collapse is the foam mileage or capacity for the formula. This simulates soil being introduced from washing of dirty plates, and measures how many plates could be washed before the foam is gone. The result of the foam mileage test is shown in Table 2, where each test formula with polymer is indexed against the control formulation without polymer according to the equation:

Index=100×(foam mileage of test formula)/(foam mileage of control)

TABLE 2

| Formula | Index |
| --- | --- |
| A | 100 |
| B | 115 |
| C | 106 |
| D | 104 |
| E | 102 |

Meaningful differences in the above test are 5+% or more over the control formula (A). The formulation of the present technology comprising the urethane polymer demonstrates a 15% increase in foam milage over the control, and provides approximately 3-7 times the benefit for the same amount used in the comparison polymers (C, D, E).

The ability of the polymer of the present technology to boost foam performance in the presence of sparingly soluble cleaning solvents is summarized in Table 3, which contains foam mileage performance data for a commercial liquid dish product that was diluted, solvent added, and then polymer added:

TABLE 3

| Product | Index |
| --- | --- |
| Premium Liquid Hand Dishwashing Product Available Commercially, diluted to 81% strength | 100 |
| Premium Liquid Hand Dishwashing Product Available Commercially, diluted to 81% strength, 2.7% Steposol ® M8-10 added | 82 |
| Premium Liquid Hand Dishwashing Product Available Commercially, diluted to 81% strength, 1.8% Steposol ® M8-10 added, 0.23% urethane polymer added | 121 |

The foam performance index shows the effect of the sparingly water soluble solvent (e.g. Steposol® M8-10), which significantly reduces foam mileage. Addition of the polymer of the present technology brings the foam mileage back to a point that is greater than the original product without the sparingly soluble cleaning solvent.

The ability of the urethane polymer of the present technology to reduce surface tension was tested using a Kruss Tensiometer with Wilhelmy plate (available from Kruss, Del.). The ability of the urethane polymer of the present technology to reduce surface tension is shown in FIG. 1, the graph of surface tension vs. concentration for a polymer-only solution in DI water.

Even with no surfactants present in the solution, a 1 ppm level of the polymer brings the surface tension from 70 mN/m (surface tension of blank) to about 56 mN/m, and to about 54 mN/m at about 30 ppm polymer solution, as shown in FIG. 1. It is observed that solutions containing 0.01% polymer (100 ppm) wet both plastic and glass surfaces, and exhibit some degree of foaming, with no other added components. It is expected this will be useful for glass cleaning compositions and other hard surface cleaners.

Example 3

Exemplary Hard Surface Cleaning Formulations that Use the Polymer of this Technology The following list summarizes materials used in compositions that contain the polymer of the present technology:

| Trade Name | Chemical Name |
| --- | --- |
| Bio-Soft ® N91-6 | C9-11 Alcohol Ethoxylate, 6EO average |
| Stepanol ® WA-Extra | Sodium Lauryl Sulfate |
| Ammonyx ® LMDO | Lauramidopropyl/Myristamidopropyl Amine Oxide |
| Ammonyx ® LO | Lauramine Oxide |
| Bio-Terge ® PAS-8S | Sodium Caprylyl Sulfonate |
| Urethane polymer | Exemplary polymer of this invention |

All of the trademarked components are commercially available from Stepan Company, of Northfield, IL.

Table 4 describes examples of hard surface cleaner formulations that contain the urethane polymer of the present technology and Table 5 demonstrates glass cleaners containing urethane polymers of the present technology (% Active as percent of total in composition):

TABLE 4

| Component | Formula 1 | Formula 2 |
| --- | --- | --- |
| Bio-Soft ® N91-6 | 2.0 | 3.0 |
| Stepanol ® WA-Extra | 2.0 | |
| Ammonyx ® LMDO | | 2.0 |
| Ammonyx ® LO | | |
| Bio-Terge ® PAS-8S | | |
| Dowanol DB | 4.0 | 2.0 |
| Dowanol PnB | | |
| Sodium Citrate | 4.0 | |
| Citric Acid | | 3.0 |
| Urethane Polymer | 0.5 | 0.3 |
| Water | balance | balance |

Dowanol DB and Dowanol PnB are trademarks of the Dow Chemical Corporation, Midland, MI.

TABLE 5

| Component | Formula 3 | Formula 4 | Formula 5 |
| --- | --- | --- | --- |
| Bio-Soft ® N91-6 | | | |
| Stepanol ® WA-Extra | | | |
| Ammonyx ® LMDO | | | |
| Ammonyx ® LO | 0.20 | 0.1 | |
| Bio-Terge ® PAS-8S | 1.5 | | |
| Dowanol DB | | | |
| Dowanol PnB | 2.0 | | |
| Sodium Citrate | | | |
| Citric Acid | | | |
| Urethane Polymer | 0.05 | 0.02 | 0.02 |
| Water | balance | balance | balance |

Formula 5 is a preferred embodiment containing only the polymer of the present technology and no solvent or surfactant.

It is understood by those skilled in the art that each of formulas 1-5 can be concentrated, removing water, or diluted, depending on the cleaning task. Formulas 3 and 4 are typical of glass cleaning compositions, Formula 5 is a new glass cleaning composition containing only the polymer of the present technology, while Formulas 1 and 2 are typical of all-purpose and bath cleaning compositions.

Example 4

Exemplary Machine Dishwash Formulations that Use the Polymer of this Technology

The following list summarizes materials used in compositions that contain the polymer of the present technology:

| Trade Name | Chemical Name |
|---|---|
| Bio-Soft ® N91-2.5 | C9-11 Alcohol Ethoxylate, 6EO average |
| Bio-Soft ® N1-5 | C11 Alcohol Ethoxylate, 5EO average |
| Ammonyx ® LO | Lauramine Oxide |
| Bio-Terge ® PAS-8S | Sodium Caprylyl Sulfonate |
| Urethane polymer | Exemplary polymer of this invention |
| Sodium Citrate | Sodium Citrate |
| Sodium Bicarbonate | Sodium Bicarbonate |
| Sodium Carbonate | Sodium Carbonate |
| Sodium Silicate | Sodium Silicate |
| Propylene Glycol | Propylene Glycol |
| Sodium Borate | Sodium Borate |
| Zinc Chloride | Zinc Chloride |

All of the trademarked components are commercially available from Stepan Company, of Northfield, IL.

The following are examples of materials that may be used in machine dishwash compositions which could be formulated to include the polymer of this technology:

| | |
|---|---|
| Properase 1600L | Protease Enzyme |
| Purastar HPAM 5000L | Amylase Enzyme |
| Neolone M-10 | 2-Methyl-4-isothiazolin-3-one and 2-Methyl-3(2H)isothiazolinone |
| Trilon M | trisodium salt of methylglycinediacetic acid |
| Gantrez S-95 | copolymer of methyl vinyl ether and maleic acid |

Properase and Purastar are trademarked materials available from Genencor, Rochester NY.
Neolone is a trademarked preservative available from the Dow Chemical Corporation, Midland, MI.
Trilon M is a trademarked chelant available from BASF, Ludwigshafen, Germany.
Gantrez S-95 is a trademarked acrylic polymer available from ISP, Wayne, NJ.

Table 6 describes examples of machine dishwash formulations that contain the urethane polymer of the present technology (% Active as percent of total in composition). Formula 1 is typical of a neutral to slightly alkaline composition which contains enzymes, and Formula 2 is typical of an alkaline composition:

TABLE 6

| Component | Formula 1 | Formula 2 |
|---|---|---|
| Bio-Soft ® N91-2.5 | 0.25 | 0.5 |
| Bio-Soft ® N1-5 | 0.50 | |
| Ammonyx ® LO | | 0.20 |
| Bio-Terge ® PAS-8S | 1.0 | 1.0 |
| Sodium Citrate | 15 | 20 |
| Sodium Bicarbonate | 5 | |
| Sodium Carbonate | | 5 |
| Sodium Silicate | | 10 |
| Propylene Glycol | 2.0 | |
| Sodium Borate | 2.0 | |
| Zinc Chloride | 0.5 | 0.5 |
| Protease Enzyme | 1.0 | |
| Amylase Enzyme | 0.30 | |
| Neolone M-10 | 0.08 | |
| Trilon M | 2.0 | 2.0 |
| Gantrez S-95 | 3.0 | |
| Urethane Polymer | 1.0 | 1.0 |
| Water | balance | balance |

Example 5

Use of Polymer to Enhance Foam Mileage

The ability of the hydrogel polymer of the present technology to enhance foam mileage is shown in this example. The following formulations were tested for their foaming ability as measured by foam mileage and their cleaning ability:

Formula 1: Ultra Dawn, lot code 00931729083
Formula 2: Ultra Dawn in Formula 1, diluted to 80% strength (40 grams Dawn diluted to 50 grams total using DI water)
Formula 3: Ultra Dawn in Formula 1, diluted to 80% strength, 0.20% urethane polymer of the present technology (40 grams Dawn plus 0.40 gram 50% polymer in DI water, diluted to 50 grams total with DI water)

The foam mileage test was performed using the Automated miniplate test using the KitchenAid mixer, as previously described, except with a different soil than the ASTM D4009-92 Soil D described in Example 2. In this Example, the soil used was Shell Soil, known in the art, and contained the following components:

Crisco®, olive oil, potato powder, and water.

Procedure:

A 0.05% solution of each test sample is prepared in 500 grams of 150 ppm hardness water at a starting temperature of the test solution of about 45° C. This wash bath is agitated with the KitchenAid mixer set on a speed of 6. Shell soil is introduced into the wash solution with a Harvard Apparatus at a rate of about 0.45 mL/min (approximately about 0.45 g/min). The results of the test are shown below in Table 7.

TABLE 7

| Formula | Wt. start | Wt. end | Soil wt. | Time (sec) | Rate (g/min) | Mini Plates | ID | Avg Mini Plates | test | Sig? | Index |
|---|---|---|---|---|---|---|---|---|---|---|---|
| 1 | 33.61 | 31.62 | 1.99 | 274 | 0.44 | 33.2 | Dawn | 35.3 | — | — | 100.0 |
|   | 31.62 | 29.35 | 2.27 | 298 | 0.46 | 37.8 | | | | | |
|   | 29.35 | 27.26 | 2.09 | 277 | 0.45 | 34.8 | | | | | |
| 2 | 34.64 | 33.41 | 1.23 | 171 | 0.43 | 20.5 | 80% Dawn | 21.8 | 0.000 | Yes | 61.7 |
|   | 33.41 | 32.06 | 1.35 | 178 | 0.46 | 22.5 | | | | | |
|   | 32.00 | 30.66 | 1.34 | 186 | 0.43 | 22.3 | | | | | |
| 3 | 30.66 | 29.25 | 1.41 | 193 | 0.44 | 23.5 | 80% Dawn + | 24.6 | 0.014 | Yes | 69.6 |
|   | 29.25 | 27.75 | 1.50 | 206 | 0.44 | 25.0 | 0.20% | | | | |
|   | 34.75 | 33.24 | 1.51 | 213 | 0.43 | 25.2 | 3793-43 | | | | |

The results in Table 7 show that a commercial light duty liquid dish detergent, when diluted (Formula 2) has poorer performance in the foam mileage test than the undiluted light duty liquid dish detergent (Formula 1). However, when only a small amount (0.20%) of the urethane polymer is added to the diluted light duty liquid dish detergent (Formula 3), some of the foam performance is regained.

In fact, more performance is regained with a given amount of polymer than would be obtained with the surfactants that were removed. Ultra Dawn is about 30% active surfactant. When it is diluted to 80% strength, the actives drop to 24%. This is a drop of 6% actual surfactant actives. The amount of polymer added is only 0.20%, or 1/30th the amount of surfactant removed. This 0.20% polymer adds an amount of performance back that is equivalent to 1.2% surfactant, as determined by the following equation:

Equivalent Performance=(change in % surfactant)×(gain in performance from polymer)/(change in performance due to change in % surfactant)

Equivalent Performance=6%×(69.6−61.7)/(100−61.7)=1.2%

From this Equivalent Performance equation, it can be seen that the polymer of the present technology is about 6 times more effective at building performance as the surfactants. It is believed that, while the surfactants provide the foundation for performance, the polymer of the present technology stabilizes the system as if more surfactant had been added, but at a much lower level.

The present technology is now described in such full, clear and concise terms as to enable a person skilled in the art to which it pertains, to practice the same. It is to be understood that the foregoing describes preferred embodiments of the present technology and that modifications may be made therein without departing from the spirit or scope of the present technology as set forth in the appended claims. Further the examples are provided to not be exhaustive but illustrative of several embodiments that fall within the scope of the claims.

What is claimed is:

1. A water-dispersible or water-soluble composition comprising one or more water-dispersible or water-soluble star polymers, wherein the one or more star polymers comprises:
   (a) a core comprising C1-6 linear, branched, or cyclic hydrocarbon having at least two reactive groups;
   (b) two or more arms radiating out from the core, each arm having the following Formula 1:

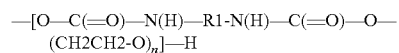

wherein n=4-12, R1 is the same or different and is dicyclohexylmethane, diphenylmethane, or toluene.

2. The water-dispersible or water-soluble composition of claim 1, wherein the one or more water-dispersible or water soluble star polymers comprises a star polymer having the following formulation:

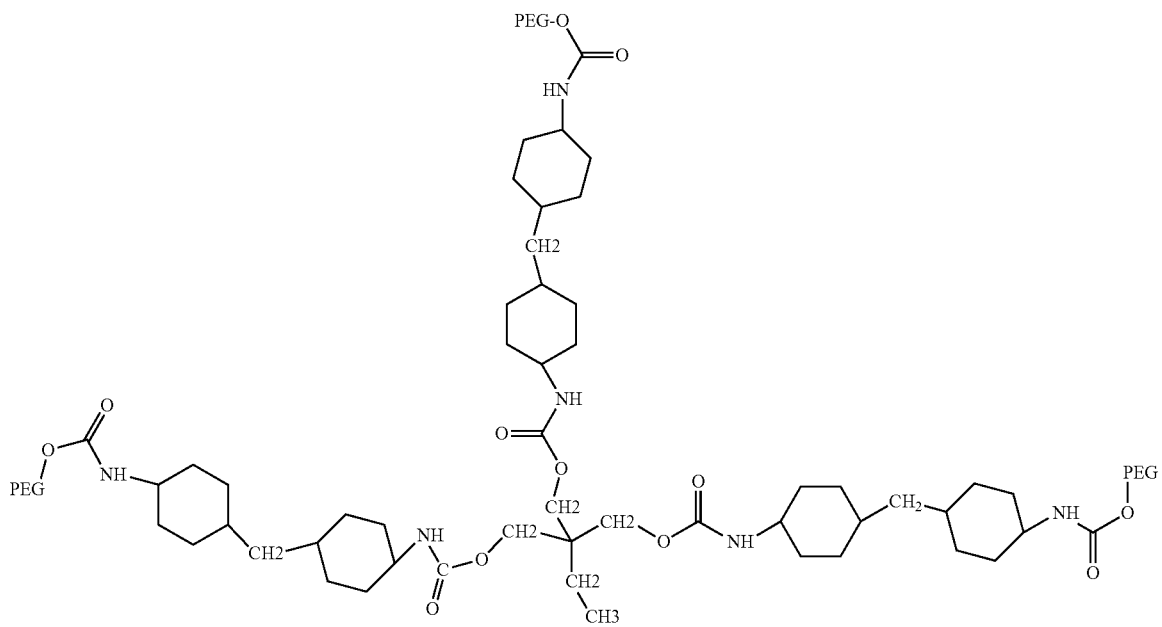

wherein PEG is polyethylene glycol.

3. The water-dispersible or water-soluble composition of claim 1, wherein the one or more water-dispersible or water-soluble polymers have at least some crosslinking, wherein an isocyanate group on each arm bonds with at least one hydrophilizing molecule containing at least 2 hydrophilic groups per molecule to provide the crosslinking between star polymers.

4. The water-dispersible or water-soluble composition of claim 3, wherein the at least one hydrophilizing molecule is polyethylene glycol.

5. The water-dispersible or water-soluble composition of claim 4, wherein the one or more water-dispersible or water-soluble polymer comprises a star polymer having the following formulation:

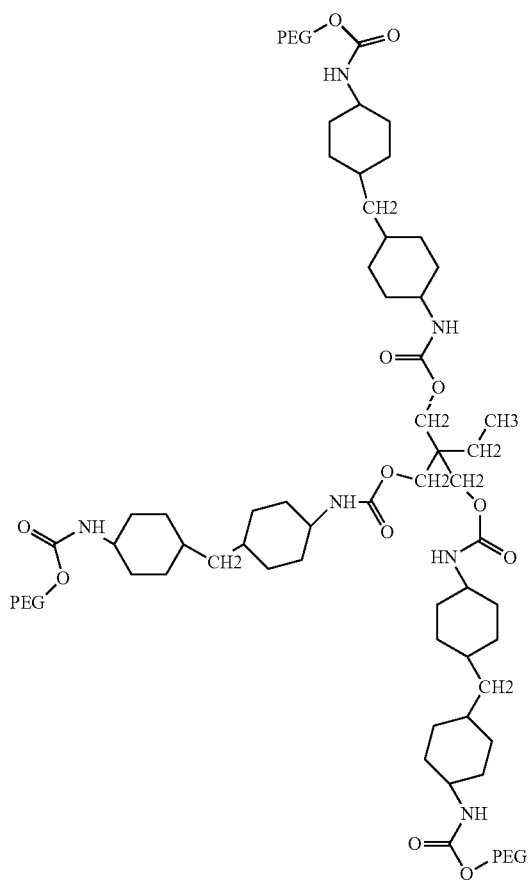
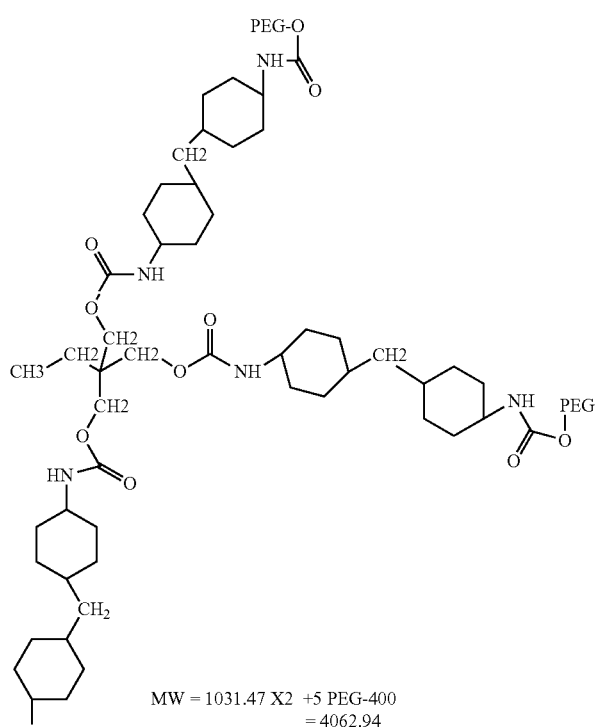

MW = 1031.47 X2 +5 PEG-400
= 4062.94 wherein PEG is polyethylene glycol.

6. The water-dispersible or water-soluble composition of claim 1, wherein the core is selected from the group consisting of trimethylolpropane, glycerol, propylene glycol, 1,3-propandiol, and glucose.

7. The water-dispersible or water-soluble composition of claim 1, wherein the star polymer has from 2 to 6 arms.

8. The composition of claim 1, wherein the composition further comprises water.

9. A cleaning composition comprising about 0.01% to about 50% by weight of at least one water-dispersible or water-soluble composition, wherein the water-dispersible or water soluble composition comprises one or more water-dispersible or water-soluble star polymers, wherein the one or more star polymers comprises:
 (a) a core comprising C1-6 linear, branched, or cyclic hydrocarbon having at least one reactive group;
 (b) one or more arms radiating out from the core, each arm having the following Formula 1:

—[O—C(=O)—N(H)—R1-N(H)—C(=O)—O—(CH$_2$CH$_2$—O)$_n$]—H wherein n=4-12, R1 is the same or different and is dicyclohexylmethane, diphenylmethane, or toluene.

10. The cleaning composition of claim 9, wherein the cleaning composition comprises about 0.01% to about 10% by weight of the at least one water-dispersible or water-soluble composition.

11. The cleaning composition of claim 9, wherein the cleaning composition comprises about 0.01% to about 1% by weight of the at least one water-dispersible or water-soluble composition.

12. The cleaning composition of claim 9, wherein the cleaning composition comprises about 0.01% to about 0.1% by weight of the at least one water-dispersible or water-soluble composition.

13. A light duty liquid detergent composition comprising about 0.01% to about 10% of the water-dispersible or water-soluble composition, wherein the water-dispersible or water soluble composition comprises one or more water-dispersible or water-soluble star polymers, wherein the one or more star polymers comprises:
 (a) a core comprising C1-6 linear, branched, or cyclic hydrocarbon having at least one reactive group;
 (b) one or more arms radiating out from the core, each arm having the following Formula 1:

—[O—C(=O)—NH—R1-N(H)—C(=O)—O—(CH$_2$CH$_2$—O)$_n$]—H wherein n=4-12, R1 is the same or different and is dicyclohexylmethane, diphenylmethane, or toluene.

14. The light duty liquid detergent composition of claim 13, wherein the composition comprises about 0.01% to about 1.0% of the water-dispersible or water soluble composition.

15. The light duty liquid detergent composition of claim 13, wherein the detergent composition has an increased foam performance as compared with the detergent composition not containing the at least one water-dispersible or water soluble composition, wherein the foam milage is measured by the Automated Mixed Soil Gram Test.

16. The light duty liquid detergent of claim 13, wherein the composition provides enhanced soil release as compared to a composition not containing the at least one water-dispersible or water soluble composition.

17. The cleaning composition of claim 9, wherein the composition provides enhanced soil release as compared to a composition not containing the at least one water-dispersible or water soluble composition.

18. A glass cleaner composition comprising about 0.01% to about 0.1% of the water-dispersible or water soluble composition, wherein the water-dispersible or water soluble composition comprises one or more water-dispersible or water-soluble star polymers, wherein the one or more star polymers comprises:
(a) a core comprising C1-6 linear, branched, or cyclic hydrocarbon having at least one reactive group;
(b) one or more arms radiating out from the core, each arm having the following Formula 1:

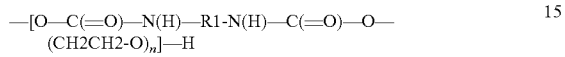
—[O—C(=O)—N(H)—R1-N(H)—C(=O)—O—(CH2CH2-O)$_n$]—H wherein n=4-12, R1 is the same or different and is dicyclohexylmethane, diphenylmethane, or toluene.

19. The glass cleaner composition of claim 18, wherein the glass cleaner does not contain a surfactant or solvent.

20. The cleaning composition of claim 12, wherein the cleaning composition has an increased foam performance as compared with the cleaning composition not containing the at least one water-dispersible or water soluble composition, wherein the foam milage is measured by the Automated Mixed Soil Gram Test.

* * * * *